(12) United States Patent
Mishra et al.

(10) Patent No.: US 12,147,423 B2
(45) Date of Patent: Nov. 19, 2024

(54) SYSTEMS AND METHODS FOR PROCESSING NEGATION IN NATURAL LANGUAGE SEARCH QUERIES

(71) Applicant: Adeia Guides, Inc., San Jose, CA (US)

(72) Inventors: Ajay Kumar Mishra, Karnataka (IN); Jeffry Copps Robert Jose, Tamil Nadu (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/619,035

(22) PCT Filed: May 21, 2020

(86) PCT No.: PCT/US2020/034006
§ 371 (c)(1),
(2) Date: Dec. 14, 2021

(87) PCT Pub. No.: WO2021/236087
PCT Pub. Date: Nov. 25, 2021

(65) Prior Publication Data
US 2023/0070618 A1    Mar. 9, 2023

(51) Int. Cl.
*G06F 40/205* (2020.01)
*G06F 16/2452* (2019.01)

(52) U.S. Cl.
CPC ...... *G06F 16/24522* (2019.01); *G06F 40/205* (2020.01)

(58) Field of Classification Search
CPC .................. G06F 16/24522; G06F 40/205

USPC ......................... 704/8–9, 231, 251
See application file for complete search history.

(56) References Cited

U.S. PATENT DOCUMENTS

| | | | |
|---|---|---|---|
| 9,223,836 B1* | 12/2015 | Fletcher | G06F 16/338 |
| 2012/0296635 A1* | 11/2012 | Brockett | G06F 40/166 |
| | | | 704/9 |
| 2016/0098387 A1* | 4/2016 | Bruno | G06F 40/30 |
| | | | 704/9 |
| 2017/0024465 A1 | 1/2017 | Yeh et al. | |
| 2018/0075012 A1 | 3/2018 | Allen et al. | |
| 2018/0293227 A1 | 10/2018 | Guo | |
| 2021/0258457 A1* | 8/2021 | Akkaya | G01S 17/894 |

OTHER PUBLICATIONS

International Search Report and Written Opinion for International Application No. PCT/US2020/034006, dated Feb. 11, 2021.

* cited by examiner

*Primary Examiner* — George C Monikang
(74) *Attorney, Agent, or Firm* — Haley Guiliano LLP

(57) ABSTRACT

Systems and methods are described herein for processing negation in a natural language search query. The natural language search query is parsed to identify a plurality of portions of the natural language search query, and a first portion is determined to be a negation portion. A second portion to which the negation portion applies and a third portion to which the negation portion does not apply are then identified, and a content query is generated which includes a negation parameter corresponding to the second portion, and at least one other parameter corresponding to at least the third portion. Search results of the content query are then generated for output to the user.

18 Claims, 9 Drawing Sheets

SYSTEMS AND METHODS FOR PROCESSING NEGATION IN NATURAL LANGUAGE SEARCH QUERIES

Cross-Reference to Related Applications

This application is a national stage application under 35 U.S.C. § 371 of International Application PCT/US2020/034006, filed May 21, 2020, the disclosure of which is hereby incorporated by reference herein in its entirety.

BACKGROUND

The present disclosure relates to natural language searching and, more particularly, processing of negation terms in natural language search queries.

SUMMARY

Natural language search engines allow users to perform searches using plain text or spoken commands that need not conform to a particular set of construction rules. For example, a user may enter a search for content items featuring two particular actors by entering a query using words and grammatical structures matching those the user would use when speaking to another person. The natural language search engine processes the query to identify the corresponding search parameters and performs the appropriate search. Existing natural language search engines, however, ignore or incorrectly interpret negation terms when included in natural language search queries. For example, if a user says "Show me movies with Tom Hanks and not Julia Roberts," existing natural language search engines will ignore the word "not" and return results for movies in which Tom Hanks and Julia Roberts appear together.

Systems and methods are described herein for processing negation in a natural language search query. The natural language search query is parsed to identify a plurality of portions of the natural language search query, and a first portion is determined to be a negation portion. A second portion to which the negation portion applies and a third portion to which the negation portion does not apply are then identified, and a content query is generated that includes a negation parameter corresponding to the second portion, and at least one other parameter corresponding to at least the third portion. Search results of the content query are then generated for output to the user. The natural language search query may be parsed using a machine learning algorithm, such as Conditional Random Field. In some embodiments, the natural language search query is parsed using a neural network. The neural network may employ a long short-term memory architecture. The natural language search query may alternatively be parsed using a Hidden Markov Model.

For example, if the user says "Show me movies with Tom Hanks and not Julia Roberts," several portions will be identified, including "Tom Hanks," "and," "not," and "Julia Roberts." The "not" portion will be recognized as a negation portion and it will be determined that it applied to "Julia Roberts," i.e., the second portion, but did not apply to "Tom Hanks," i.e., the third portion. A query is then constructed that retrieves content starring Tom Hanks but excludes content starring Julia Roberts.

Parsing the natural language search query to identify the plurality of portions of the natural language search query may be accomplished by first identifying a plurality of words of the natural language search query and tagging each word of the plurality of words with a corresponding part of speech. It can then be determined whether a first word and a second word immediately following the first word form a portion together. If so, those two words are identified as a single portion. If not, the first word alone is identified as a portion.

To determine if a first portion of the plurality of portions of the natural language search query is a negation portion, in some embodiments, it is determined whether a word of a portion includes a negation prefix, such as "un-" or "non-." In addition, it can be determined whether the word includes a negation suffix, such as "-less." If the portion contains more than one word, it can also be determined whether two or more words of the portion, taken together, match a negation phrase list.

In some embodiments, identifying a second portion to which the negation portion applies involves first determining, based on natural language processing, whether the negation portion precedes a portion to which it applies or whether the negation portion follows a portion to which it applies. In response to determining that the negation portion precedes the portion to which it applies, the portion immediately following the negation portion is identified as the portion to which the negation portion applies. In response to determining that the negation portion follows the portion to which it applies, the portion immediately preceding the negation portion is identified as the portion to which the negation portion applies. To determine whether the negation portion precedes a portion to which it applies or whether the negation portion follows a portion to which it applies, a language in which the natural language search query was entered is determined, and a dialect of the language is identified based on grammatical structures of the natural language search query. A set of linguistic rules pertaining to the dialect is retrieved and, based on the linguistic rules, it is determined whether the negation portion precedes the portion to which it applies or whether the negation portion follows the portion to which it applies. For example, commonly used grammatical structures differ between different dialects of English within the United States, within Great Britain, and between the United States and Great Britain. Additionally, in places where English has become a standard language alongside other languages native to the region, such as India, native grammatical structures may influence the usage of English in that region. By determining the dialect of English being used, the determination of a portion to which the negation portion applies can be made more accurately.

In some embodiments, identifying a second portion to which the negation portion applies is accomplished by identifying an entity type of each portion of the plurality of portions. At least two candidate portions of the plurality of portions having the same entity type are then identified and a distance between each candidate portion and the negation portion is determined. The candidate portion closest to the negation portion is then identified as the portion to which the negation portion applies.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
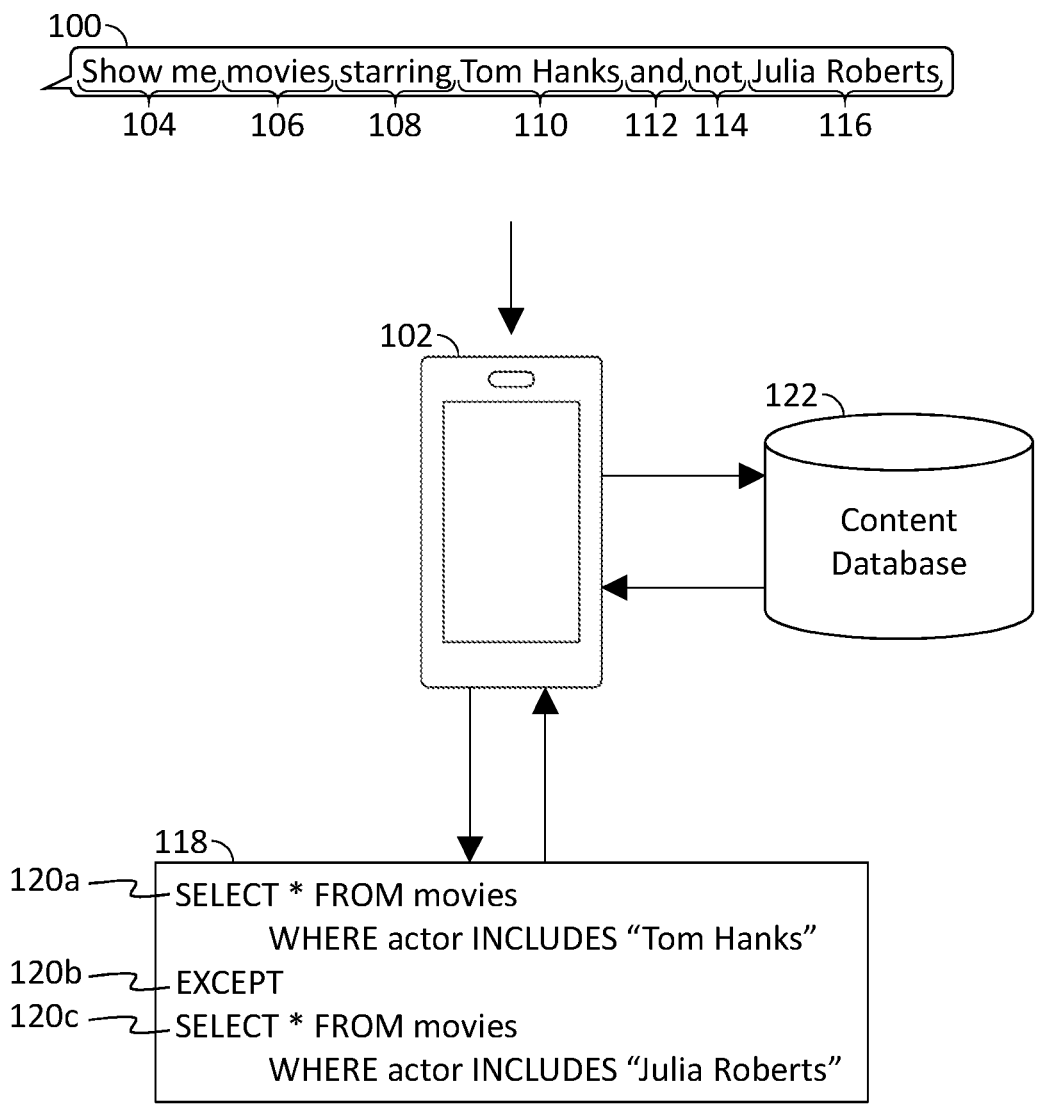
FIG. 1 shows receipt and processing of an exemplary natural language search query, in accordance with some embodiments of the disclosure.
Figure 2:
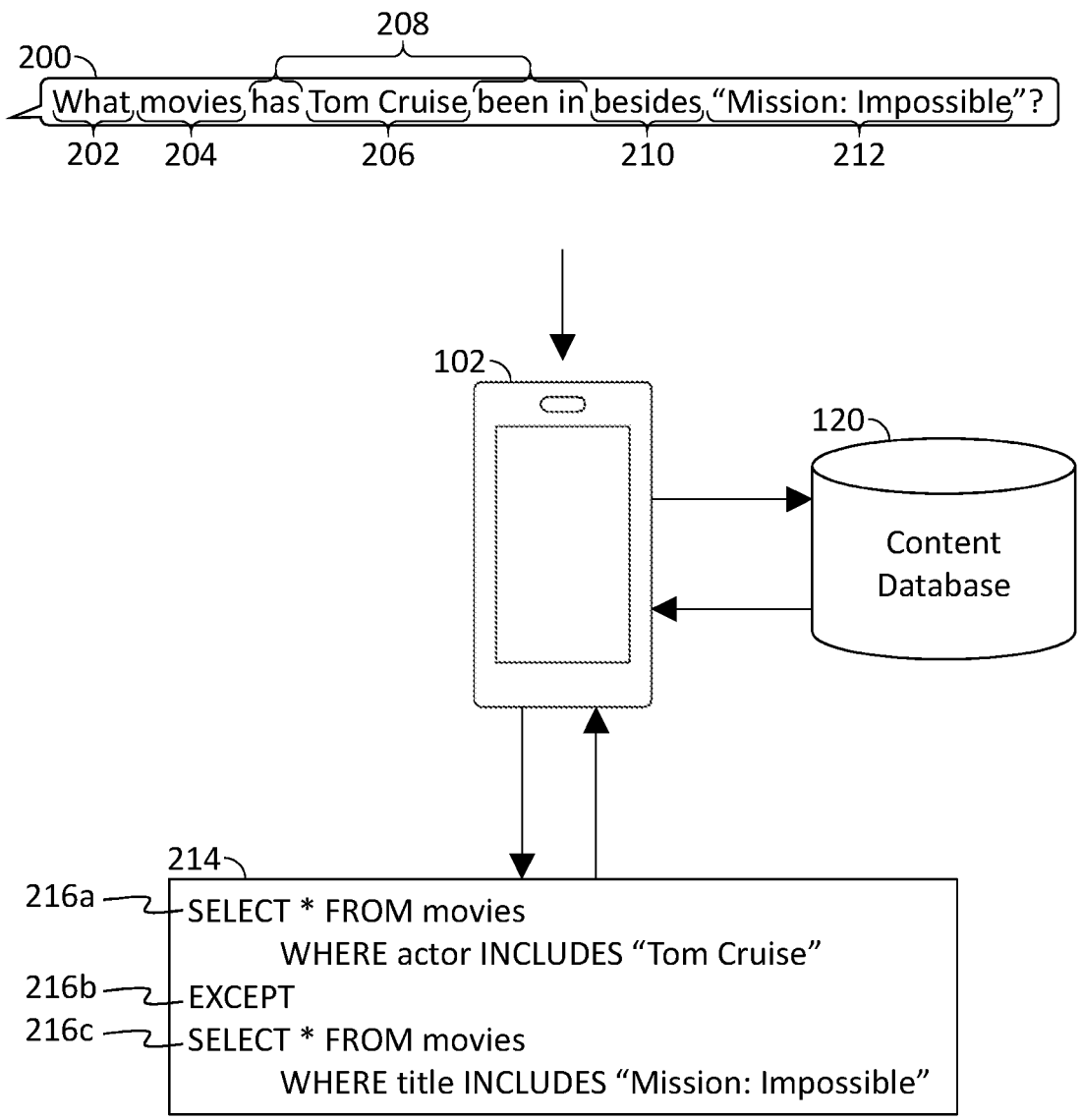
FIG. 2 shows receipt and processing of a second exemplary natural language search query, in accordance with some embodiments of the disclosure.
Figure 3:
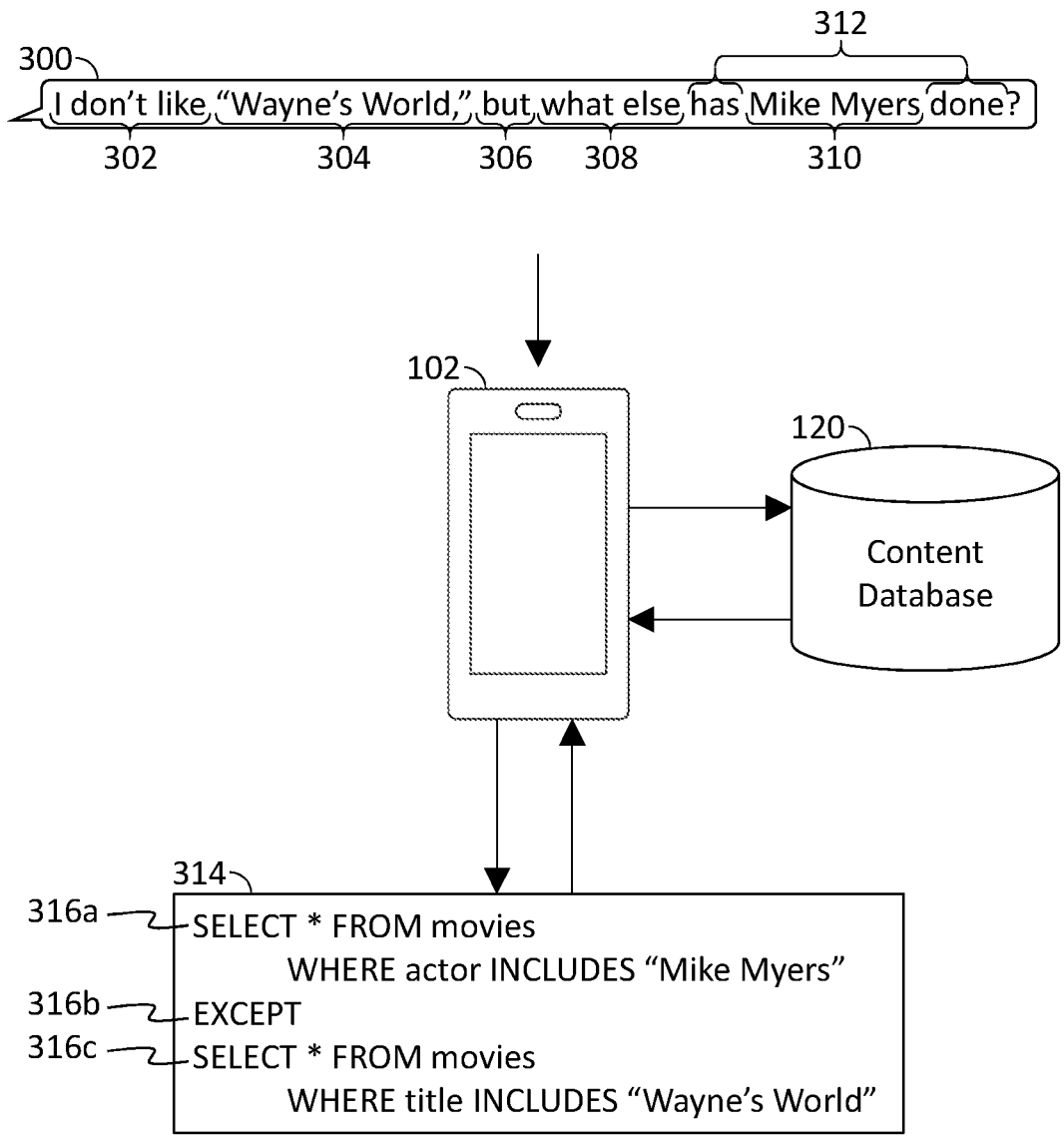
FIG. 3 shows receipt and processing of a third exemplary natural language search query, in accordance with some embodiments of the disclosure.

FIGS. 1-3 show receipt and processing of exemplary natural language search queries, in accordance with some embodiments of the disclosure. Referring first to FIG. 1, natural language search query 100 is received by media device 102. Media device 102 may be any device capable of outputting or instructing a remote device to output a content item. Media device 102 processes natural language search query 100 to identify a number of portions 104, 106, 108, 110, 112, 114, and 116 of natural language search query 100. Media device 102 identifies portion 104 "Show me" as a first portion indicating the start of a query. Portion 106 "movies" is then identified as a type of content for which query 100 has been entered. Media device 102 identifies portion 108 "starring" as a filter term indicating that the query is to be filtered based on an actor whose name follows the filter portion 108, namely, portion 110 "Tom Hanks." Portion 112 "and" is a conjunction that is identified by media device 102 as indicating the inclusion of a second search parameter in query 100.

Portion 114 "not" is identified as a negation portion. Based on the grammatical structure of query 100, and the identification of other portions in query 100, media device 102 determines that negation portion 114 applies to the portion following negation portion 114, namely, portion 116 "Julia Roberts," but does not apply to the portion before the negation portion 114, namely, "Tom Hanks."

Having identified each portion of query 100, media device 102 constructs a database query, such as database query 118, which may be, for example, an SQL query. Database query 118 includes a first parameter 120a for retrieving content including actor Tom Hanks, a negation or exception clause 120b, and a second parameter 120c for identifying content including actor Julia Roberts for exclusion from the results matching the first parameter. Database query 118 is then transmitted to content database 122, which returns content listings matching the parameters of database query 118.

FIG. 2 shows receipt and processing of natural language search query 200 having a different grammatical structure compared to query 100. Media device 102 processes natural language search query 200 to identify a number of portions 202, 204, 206, 208, 210, and 212 of natural language search query 200. Media device 102 identifies portion 202 "What" as a first portion indicating the start of a query, and portion 204 "movies" as a portion indicating the type of content for which query 200 has been entered. Media device 102 processes the word "has" and determines that it has no meaning by itself and must therefore be part of a larger phrase. Media device 102 then continues to process query 200 to identify additional portions as well as additional words to form a complete portion with the word "has." Media device 102 thus identifies portion 206 "Tom Cruise" as a proper noun and may determine by, for example, searching a database for the name "Tom Cruise," that "Tom Cruise" is the name of an actor. Media device 102 then processes the words "been in" and determines that these words, along with "has," form a portion 208, which media device 102 identifies as a filter term indicating that the query is to be filtered based on inclusion of an actor. Media device 102 applies this filter term to the actor Tom Cruise because the words of portion 208 "has been in" surround portion 206 "Tom Cruise." Media device 102 identifies portion 210 "besides" as a negation portion, as the word "besides" is used to indicate a specific item or class of items which are to be excluded from a larger group of items. Media device 102 determines, based on the grammatical structure of query 200 and the previously identified portions of query 200, that negation portion 210 applies to the portion following negation portion 210, namely, portion 212, "Mission: Impossible," but does not apply to the portion preceding the negation portion 210, namely, portion 206 "Tom Cruise." Media device 102 identifies "Mission: Impossible" as a proper noun and, similar to the identification of "Tom Cruise" as an actor, identifies "Mission: Impossible" as the title of a content item or series of content items.

Having identified each portion of query 200, media device 102 constructs a database query, such as database query 214. Database query 214 includes a first parameter 216a for retrieving content including actor Tom Cruise, a negation or exception clause 216b, and a second parameter 216c for identifying content whose title includes the words "Mission: Impossible" for exclusion from the results matching the first parameter 216a. Database query 214 is then transmitted to content database 120, which returns content listings matching the parameters of database query 214.

FIG. 3 shows receipt and processing of a third exemplary natural language search query having a grammatical structure that differs from that of natural language search query 100 and natural language search query 200. Media device 102 processes natural language search query 300 to identify a number of portions 302, 304, 306, 308, 310, and 312 of natural language search query 300. Media device 102 identifies the words "I don't like" as a negative preference indicator. Media device 102 therefore identifies these words as a negation portion 302. Based on known grammatical structures, media device 102 determines that negation portion 302 applies to a portion that follows portion 302 and contains at least one noun and may contain an adjective. For example, in the sentence "I don't like chocolate ice cream," the negation portion "I don't like" applies to the portion "chocolate ice cream" which contains the adjective "chocolate" and the noun "ice cream."

Media device 102 identifies portion 304 "Wayne's World" as the title of a content item or series of content items, similar to the identification of "Tom Cruise" as an actor, above. Media device 102 identifies portion 306 "but" as a conjunction indicating the inclusion of a second search parameter in query 300. In normal usage, the conjunction "but" may be treated in the disjunctive. However, media device 102 determines, based on identification of negation portion 302 preceding portion 306, media device 102 determines that portion 306 should be treated in the conjunctive, and identifies it as an indicator of a second parameter included in query 300.

Media device 102 identifies portion 308 "what else" as indicating the start of a query. Having already identified a negation portion 302 and a portion to be negated 304, media device 102 determines that portion 308 is in fact the start of query 300, and that negation portion 302 and portion 304 together identify content that is to be excluded from results returned from a query for content specified by any portions following portion 308. Media device 102 processes the word "has" as described above and continues to process the remainder of query 300. Media device 102 identifies portion 310 "Mike Myers" as a proper noun and the name of an actor, using methods described above. Finally, media device 102 processes the word "done" and determines that this word, along with "has," forms a portion 312 that media device 102 identifies as a filter term indicating that the query is to be filtered based on inclusion of an actor.

Having identified each portion of query 300, media device 102 constructs a database query, such as database query 314. Database query 314 includes a first parameter 316a for retrieving content including actor Mike Myers, a negation or exception clause 316b, and a second parameter 316c for identifying content whose title includes the words "Wayne's World" for exclusion from the results matching the first parameter 316a. Database query 314 is then transmitted to content database 120, which returns content listings matching the parameters of database query 314.

In some embodiments, natural language search queries 100, 200, 300 may be parsed using a machine learning algorithm, such as Conditional Random Field, while in other embodiments, natural language search queries 100, 200, 300 are parsed using a neural network having a long short-term memory architecture. Natural language search queries 100, 200, 300 may alternatively be parsed using a Hidden Markov Model.

Figure 4:
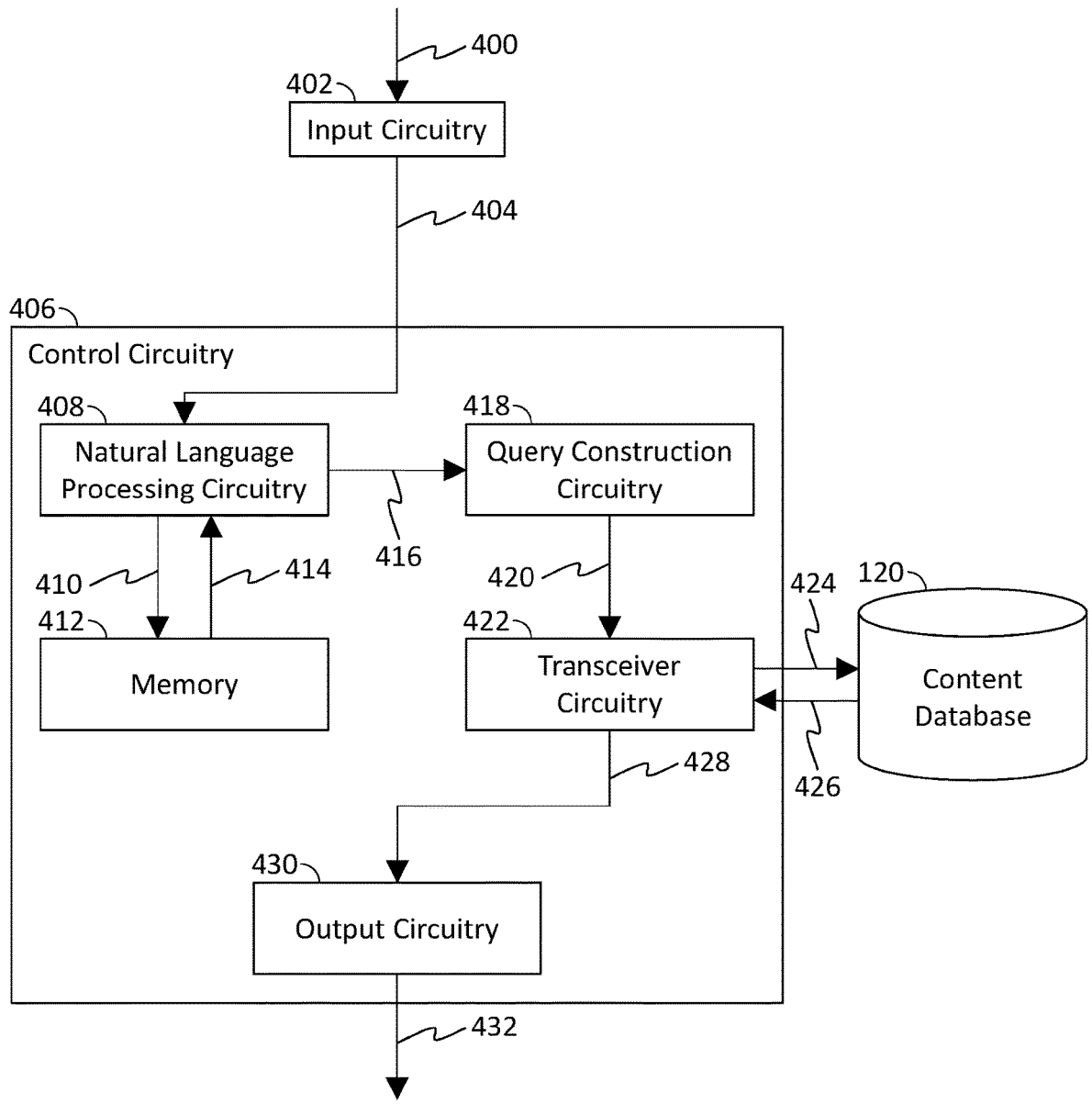
FIG. 4 is a block diagram showing components and data flow therebetween of a system for handling negation in a natural language search query, in accordance with some embodiments of the disclosure.

FIG. 4 is a block diagram showing components and data flow therebetween of a system for handling negation in a natural language search query, in accordance with some embodiments of the disclosure. A natural language search query is received 400 using input circuitry 402. Input circuitry 402 may be part of media device 102, or may be a separate device, such as an Amazon Echo® or Google Home® device, or any other device capable of receiving and relaying user input to a media device. Input circuitry 402 may be a data interface such as a Bluetooth module, WiFi module, or other suitable data interface through which data entered on another device or audio data captured by another device can be received. Alternatively, input circuitry 402 may be a keyboard, touchscreen, or other human interface device, or a microphone through which audio information is captured directly. Input circuitry 402 may convert the audio to a digital format such as WAV. Alternatively, input circuitry 402 may include speech-to-text circuitry, or other transcription circuitry/programming, which transcribes the audio data into a string of text. Input circuitry 402 communicates 404 the natural language search query to control circuitry 406. Control circuitry 406 may be part of media device 102. Control circuitry 406 may be based on one or more microprocessors, microcontrollers, digital signal processors, programmable logic devices, field-programmable gate arrays (FPGAs), application specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 406 receives and processes the natural language search query using natural language processing circuitry 408. In some embodiments, control circuitry 406 or natural language processing circuitry 408 may include the aforementioned transcription circuitry/programming rather than input circuitry 402. Natural language processing circuitry 408 identifies a plurality of terms in the natural language search query. For example, natural language processing circuitry 408 may identify individual words in the natural language search query using spaces in a transcription or pauses or periods of silence in the natural language search query. Natural language processing circuitry 408 analyzes a first word and determines whether the first word can be part of a larger phrase. For example, natural language processing circuitry 408 may access a dictionary or other word list or phrase list from memory 412. Memory 412 may be an electronic storage device such as random-access memory, read-only memory, hard drives, optical drives, solid state devices, quantum storage devices, or any other suitable fixed or removable storage devices, and/or any combination of the same.

Using the dictionary or word list or phrase list, natural language processing circuitry 408 determines if the first word can be followed by at least a second word. If so, natural language processing circuitry 408 analyzes the first word together with the word immediately following the first word to determine if the two words together form a phrase. If so, the phrase is identified as a single term in the natural language search query. Otherwise, the first word alone is identified as a single term in the natural language search query.

Once the terms of the natural language search query have been identified, natural language processing circuitry 408 identifies a language in which the natural language search query was entered and, if applicable, a dialect of the language. For example, natural language processing circuitry 408 may request 410 a data structure from memory 412 that correlates various grammatical structures with dialects of a language in which each grammatical structure is used. Upon receiving 414 the data structure from memory 412, natural language processing circuitry 408 determines the relationship of each portion of the natural language search query to each other portion of the natural language search query based on the identified grammatical structures. If natural language processing circuitry 408 identifies a negation portion, such as from a negation word list or negation phrase list retrieved from memory 412, natural language processing circuitry 408 determines to which portion or portions of the natural language search query the negation portion applies. For example, based on the identified dialect, a negation portion may immediately precede the term to be negated, or may immediately follow the term to be negated. In some cases, the negation term may be farther from the term to which it applies while in other cases the negation term may immediately precede or follow the term to which it applies. Natural language processing circuitry 408 tags the negation portion as a negation portion and includes an identifier of the portion to which it applies. Natural language processing circuitry 408 tags each portion of the natural language search query with a corresponding part of speech and transmits 416 each portion and its associated tag to query construction circuitry 418.

Query construction circuitry 418 constructs a search query corresponding to the natural language search query in a format that can be understood by, for example, content database 120. Query construction circuitry 418 uses the tags and the identifiers included with the negation portion tag to construct a query for content matching a first parameter that excludes content matching a second parameter identified by the portion to which the negation portion applies. For example, for the query "Show me movies starring Tom Hanks and not Julia Roberts," query construction circuitry 418 may receive the following portions and tags:

TABLE 1

| Portion | Tag |
| --- | --- |
| "Show me" | query Start |
| "movies" | contentType |
| "starring" | param = actor |
| "Tom Hanks" | actorName1 |
| "and" | addParam |
| "not" | negate(actorName2) |
| "Julia Roberts" | actorName2 |

Based on the received portions and associated tags in Table 1, query construction circuitry 418 constructs a database query incorporating each of the received portions. The portion "Show me" may be ignored by query construction circuitry 418 as it merely indicates the start of a query and does not provide any parameters of the query. The portion "movies," having a tag of "contentType," is used by query construction circuitry 418 to specify the type of content to be retrieved by the query. For example, query construction circuitry 418 may construct an SQL statement such as "SELECT * FROM movies" to retrieve results of the content type "movies." The tag "param=actor" associated with portion "starring" is used by query construction circuitry 418 to initialize a filter parameter in the database query. Query construction circuitry 418 then uses the portion "Tom Hanks" as the value of the filter parameter based on the tag "actorName1" corresponding to the parameter type "actor" indicated by the tag "param=actor" of the portion "starring." Continuing the example SQL query, query construction circuitry 418 may add the clause "WHERE actor EQUALS 'Tom Hanks'" to the SELECT statement in order to filter the results of the query to only those movies that include Tom Hanks as an actor. Query construction circuitry 418 may initialize a second parameter based on the portion "and" having a tag of "addParam." However, before adding an "AND" clause to the query, query construction circuitry may determine whether a negation portion is also related to the next parameter. In this case, the negation portion "not" has a tag of "negate(actorName2)," indicating that the parameter having a tag of "actorName2" should be negated in the query. Thus, continuing the example SQL query, query construction circuitry 418 adds an "EXCLUDES" clause to the query, followed by a second SELECT statement specifying movies matching the parameter having the tag "actorName2." In this example, the portion "Julia Roberts" is the portion to be excluded. Thus, the complete constructed query is "SELECT * FROM movies WHERE actor EQUALS 'Tom Hanks' EXCLUDES SELECT * FROM movies WHERE actor EQUALS 'Julia Roberts'."

In some cases, the parameter for which content is sought and the parameter to be negated may not be of the same type. For example, the natural language search query may be "What movies has Tom Cruise been in besides 'Mission: Impossible'?" This natural language search query is processed by natural language processing circuitry 408 to determine that movies starring Tom Cruise are sought, but that titles including "Mission: Impossible" should be excluded from the search results. The resulting query constructed by query construction circuitry 418 would be, for example, "SELECT * FROM movies WHERE actor EQUALS 'Tom Cruise' EXCLUDES SELECT * FROM movies WHERE title INCLUDES 'Mission: Impossible'."

Query construction circuitry 418 transmits 420 the constructed search query to transceiver circuitry 422, which transmits 424 the search query to, for example, content database 120. Transceiver circuitry 422 may be a network connection such as an Ethernet port, WiFi module, or any other data connection suitable for communicating with a remote server. Transceiver circuitry 422 then receives 426 search results from content database 120 and transmits 428 the search results to output circuitry 430. Output circuitry 430 may be any video or graphics processing circuitry suitable for generating an image for display on a display device associated with control circuitry 406, and/or any audio processing circuitry suitable for generating an audio signal for output using a speaker or other audio device associated with control circuitry 406. Output circuitry 430 then outputs 432 the content identifiers.

Figure 5:
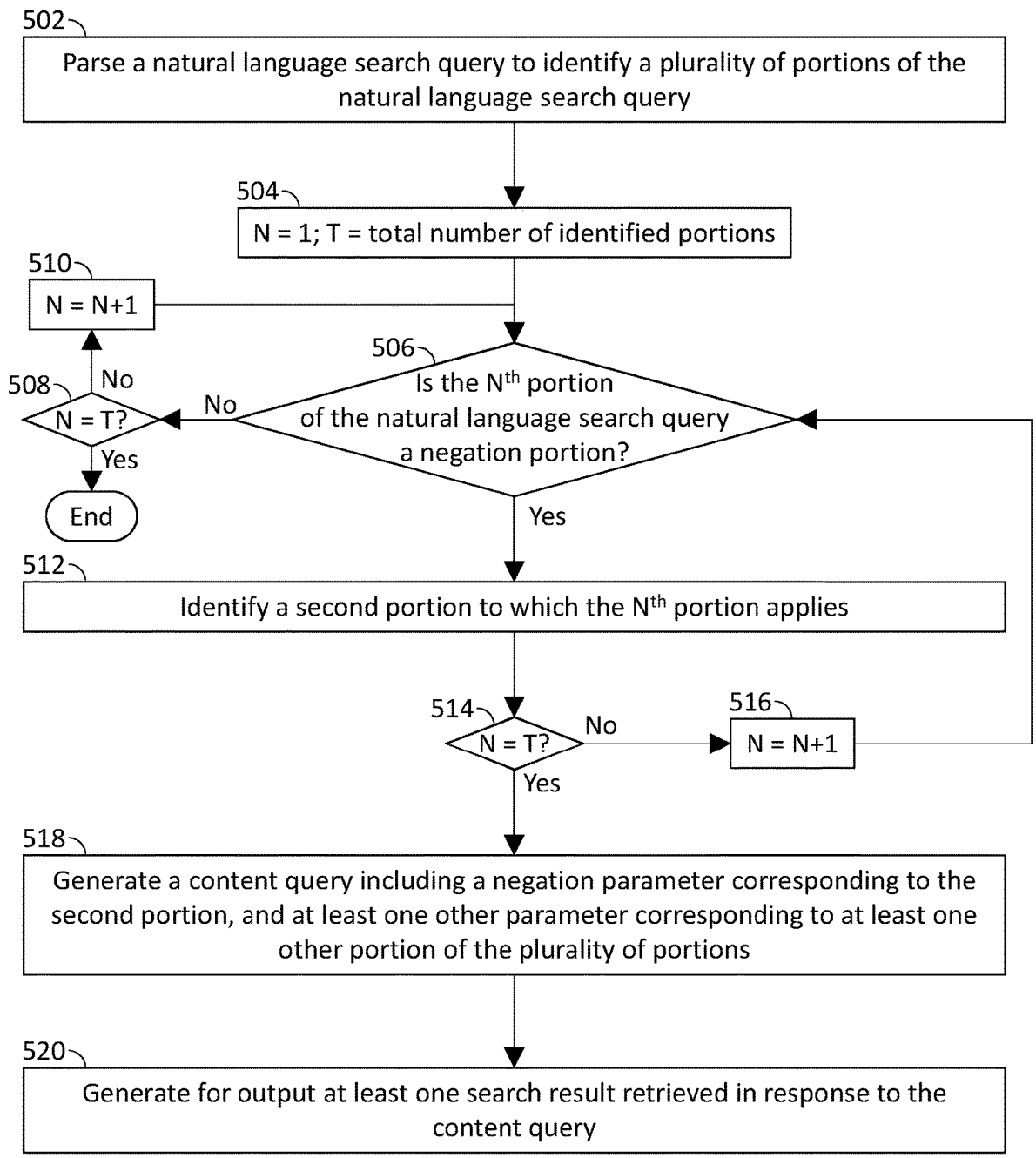
FIG. 5 is a flowchart representing a process for processing negation in a natural language search query, in accordance with some embodiments of the disclosure.

FIG. 5 is a flowchart representing an illustrative process 500 for processing negation in a natural language search query, in accordance with some embodiments of the disclosure. Process 500 may be implemented on control circuitry 406. In addition, one or more actions of process 500 may be incorporated into or combined with one or more actions of any other process or embodiment described herein.

At 502, control circuitry 406, using, e.g., natural language processing circuitry 408, parses a natural language search query to identify a plurality of portions of the natural language search query. This may be accomplished using methods described below in connection with FIG. 6. At 504, control circuitry 406 initializes a counter variable N, setting its value to one, and a variable T representing the total number of identified portions. At 506, control circuitry 406 determines whether the $N^{th}$ portion of the natural language search query is a negation portion. For example, control circuitry 406 may compare the $N^{th}$ portion to a negation word list or a negation phrase list. Control circuitry 406 may also determine whether the $N^{th}$ portion includes a negation prefix (e.g., "un-") or a negation suffix (e.g., "-less"). If the $N^{th}$ portion is not a negation portion ("No") at 506, then, at 508, control circuitry 406 determines whether N is equal to T, meaning that all portions of the natural language search query have been processed. If N is not equal to T ("No" at 508), then, at 510, control circuitry 406 increments the value of N by one, and processing returns to step 506. If N is equal to T ("Yes" at 508) and no negation portions have been identified, then the process ends.

If the $N^{th}$ portion is a negation portion ("Yes" at 506), then, at 512, control circuitry 406 identifies a second portion to which the $N^{th}$ portion applies. This may be accomplished using methods described below in connection with FIG. 7. At 514, control circuitry 406 determines whether N is equal to T, as described above in connection with step 508. If N is not equal to T ("No" at 514), then, at 516, control circuitry 406 increments the value of N by one, and processing returns to step 506. If N is equal to T ("Yes" at 514), meaning that control circuitry 406 has processed all portions of the natural language search query, then processing continues with step 518.

At 518, control circuitry 406, using, e.g., query construction circuitry 418, generates a content query including a negation parameter corresponding to the second portion, and at least one other parameter corresponding to at least one other portion of the plurality of portions. For example, control circuitry 406 may determine that the search query "Show me movies starring Tom Hanks and not Julia Roberts" includes a first portion "Tom Hanks" and a negation parameter corresponding to a second portion "Julia Roberts." Query construction circuitry then generates a query having a negation parameter corresponding to "Julia Roberts" and another parameter corresponding to "Tom Hanks."

At 520, control circuitry 406 generates for output at least one search result retrieved in response to the content query. For example, in response to the content query, a plurality of search results may be retrieved from a content database such as content database 120. The query for content including "Tom Hanks" and excluding "Julia Roberts" may return search results for "Forrest Gump," "Toy Story," "Apollo 13," "Toy Story 2," "Castaway," "The Da Vinci Code," "Toy Story 3," and "Toy Story 4." Control circuitry 406 may generate for output one or more of these results. Control circuitry 406 may determine which result or results to output based on user preferences. For example, if the user prefers mysteries and thrillers, control circuitry 406 may output the result corresponding to "The Da Vinci Code." If the user prefers children's movies, control circuitry 406 may output the results for "Toy Story," Toy Story 2," Toy Story 3," and "Toy Story 4."

The actions and descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
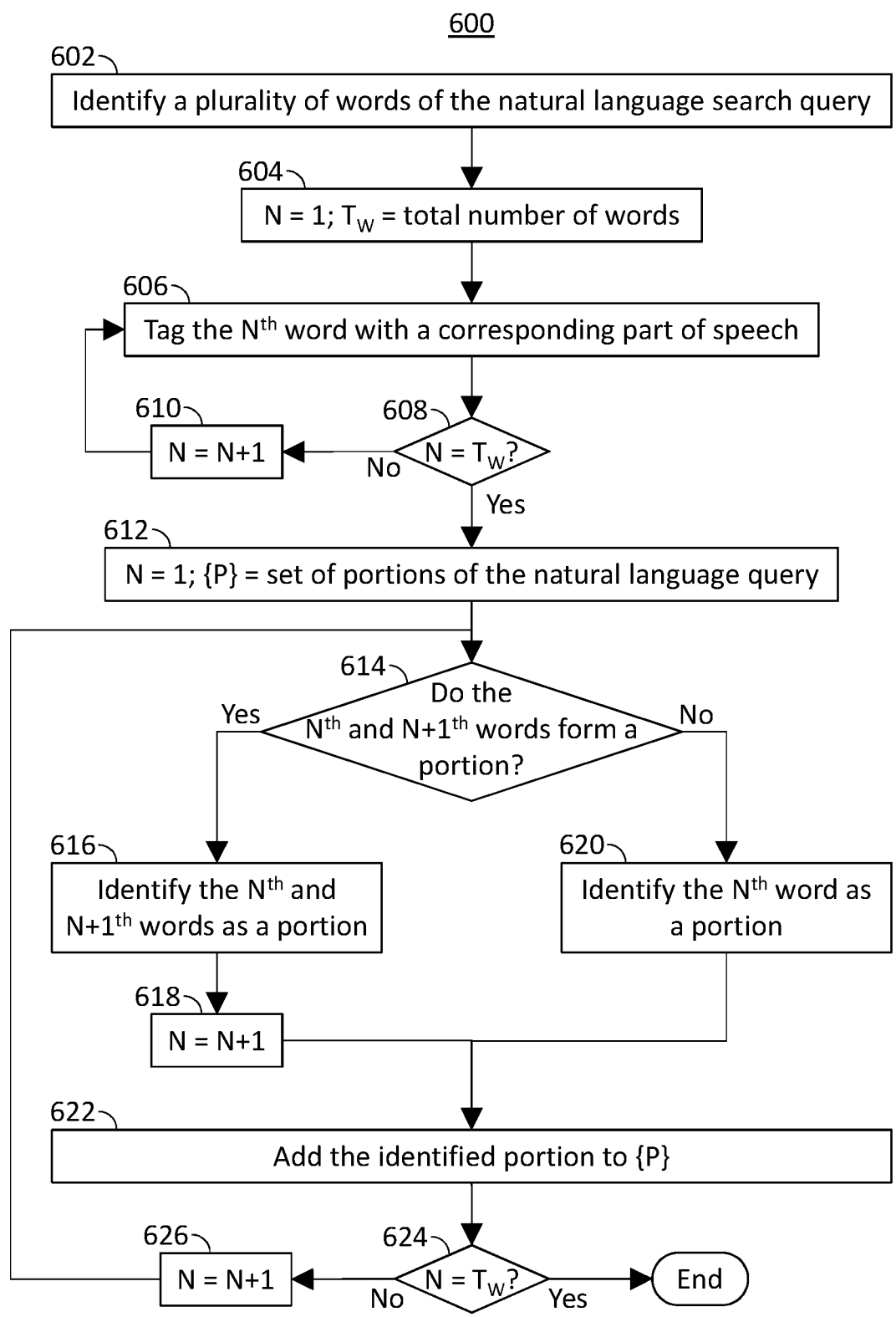
FIG. 6 is a flowchart representing a process for identifying a portion of a natural language search query, in accordance with some embodiments of the disclosure.

FIG. 6 is a flowchart representing an illustrative process 600 for identifying a portion of a natural language search query, in accordance with some embodiments of the disclosure. Process 600 may be implemented on control circuitry 406. In addition, one or more actions of process 600 may be incorporated into or combined with one or more actions of any other process or embodiment described herein.

At 602, control circuitry 406, using, e.g., natural language processing circuitry 408, identifies a plurality of words in the natural language search query. For example, natural language processing circuitry 408 may identify individual words in the natural language search query using spaces in a transcription or pauses or periods of silence in the natural language search query. At 604, control circuitry 406 initializes a counter variable N, setting its value to one, and a variable Tw, representing the total number of words identified in the natural language search query. At 606, control circuitry 406, using, e.g., natural language processing circuitry 408, tags the $N^{th}$ word with a corresponding part of speech. For example, control circuitry 406 may tag the word "blue" as an adjective, the word "Tom" as a proper noun, and the word "and" as a conjunction. At 608, control circuitry 406 determines whether N is equal to Tw, meaning that all words have been tagged. If N is not equal to Tw ("No" at 608), then, at 610, control circuitry 406 increments the value of N by one, and processing returns to step 606.

If N is equal to Tw ("Yes" at 608), then, at 612, control circuitry resets the value of N to one, and initializes a data set {P} to contain a set of portions of the natural language search query. At 614, control circuitry 406, using, e.g., natural language processing circuitry 408, determines whether the $N^{th}$ word and N+1$^{th}$ word (i.e., the word immediately following the $N^{th}$ word) together form a portion. For example, natural language processing circuitry 408 analyzes the $N^{th}$ word and determines whether the $N^{th}$ word can be part of a larger phrase. For example, natural language processing circuitry 408 may access a dictionary or other word list or phrase list from memory 412. Using the dictionary or word list or phrase list, natural language processing circuitry 408 determines if the $N^{th}$ word can be followed by at least a second word. If so, natural language processing circuitry 408 analyzes the $N^{th}$ word together with the N+1$^{th}$ word to determine if the two words together form a phrase. If so ("Yes" at 614), then, at 616, the $N^{th}$ and N+1$^{th}$ words are identified as a portion and, at 618, control circuitry 406 increments the value of N by one. If the $N^{th}$ and N+1$^{th}$ words do not form a portion ("No" at 614), then, at 620, the $N^{th}$ word alone is identified as a portion.

At 622, control circuitry 406 adds the identified portion to {P}. At 624, control circuitry 406 determines whether N is equal to Tw, meaning that all words of the natural language search query have been processed. If N is not equal to Tw ("No" at 624), then, at 626, control circuitry 406 increments the value of N by one, and processing returns to step 614. If N is equal to Tw ("Yes" at 624), then the process is complete.

The actions and descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
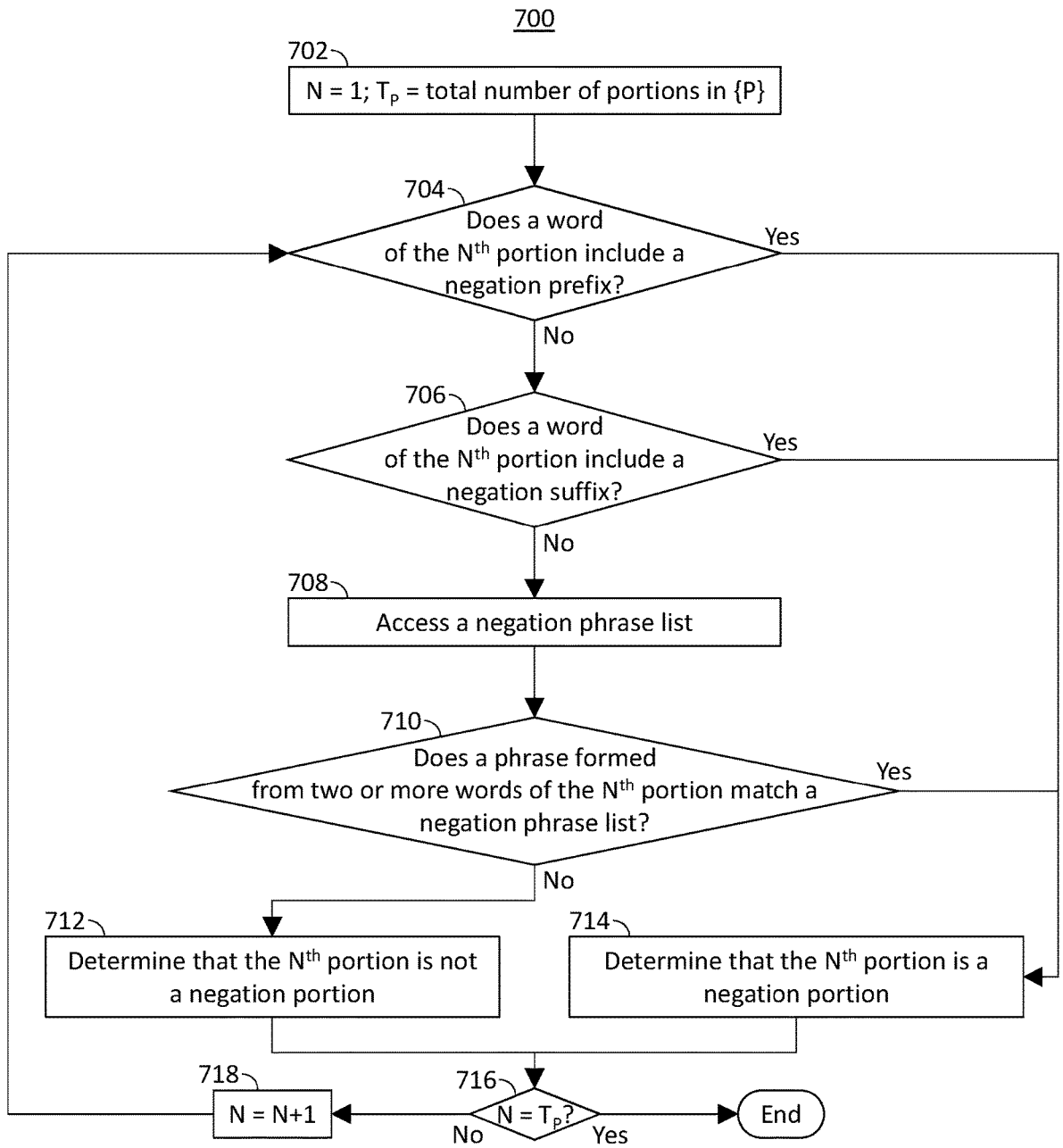
FIG. 7 is a flowchart representing a process for identifying a negation portion in a natural language search query, in accordance with some embodiments of the disclosure.

FIG. 7 is a flowchart representing an illustrative process 700 for identifying a negation portion in a natural language search query, in accordance with some embodiments of the disclosure. Process 700 may be implemented on control circuitry 406. In addition, one or more actions of process 700 may be incorporated into or combined with one or more actions of any other process or embodiment described herein.

At 702, control circuitry 406 initializes a counter variable N, setting its value to one, and a variable $T_P$ representing the total number of portions in data set {P}. At 704, control circuitry 406, using, e.g., natural language processing circuitry 408, determines whether a word of the $N^{th}$ portion in {P} includes a negation prefix. For example, a word beginning with "un-," "in-," "im-," or other prefixes indicating, in the language of the natural language search query, a negative form of a word are determined to include a negation prefix. If no words of the $N^{th}$ portion include a negation prefix ("No" at 704), then, at 706, control circuitry 406, using, e.g., natural language processing circuitry 408, determines whether a word of the $N^{th}$ portion includes a negation suffix. For example, a word ending with "-less" or other suffixes indicating, in the language of the natural language search query, a negative form of a word are determined to include a negation suffix. If no words of the $N^{th}$ portion include a negation suffix ("No" at 706), then, at 708, control circuitry 406 accesses a negation phrase list. For example, control circuitry 406 may retrieve a negation phrase list from memory 412, or from a remote server. At 710, control circuitry 406, using, e.g., natural language processing circuitry 408, determines whether a phrase formed by two or more words of the $N^{th}$ portion match a negation phrase list. For example, the $N^{th}$ portion of the natural language search query may include the words "aside from." Control circuitry 406 may compare this phrase with entries on the negation phrase list to determine if the phrase "aside from" is a negation phrase. If no matching entry is found, meaning that no set of two or more words of the $N^{th}$ portion form a phrase that matches a negation phrase list ("No" at 710), then, at 712, control circuitry 406 determines that the $N^{th}$ portion is not a negation portion. If a word of the $N^{th}$ portion does include a negation prefix ("Yes" at 704) or a negation suffix ("Yes" at 706), or if a phrase formed by two or more words of the $N^{th}$ portion matches a negation phrase list ("Yes" at 710), then, at 714, control circuitry 406 determines that the $N^{th}$ portion is a negation portion. At 716, control circuitry 406 determines whether N is equal to $T_P$, meaning that all portions in data set {P} have been processed. If N is not equal to $T_P$ ("No" at 716), then, at 718, control circuitry 406 increments the value of N by one, and processing returns to step 704. If N is equal to $T_P$ ("Yes" at 716), then the process is complete.

The actions and descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
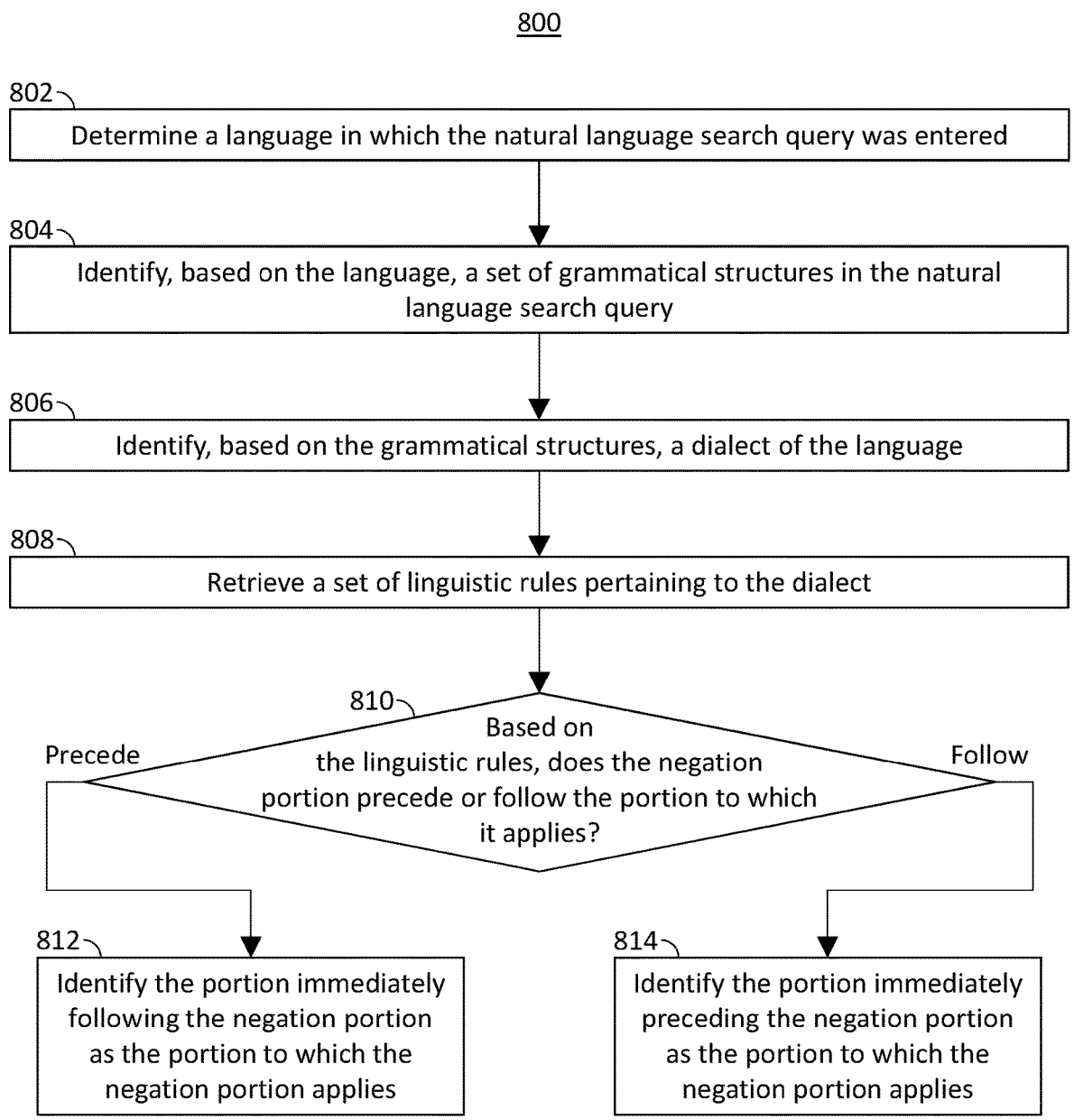
FIG. 8 is a flowchart representing a process for identifying a portion of a natural language search query to which a negation portion applies, in accordance with some embodiments of the disclosure.

FIG. 8 is a flowchart representing an illustrative process 800 for identifying a portion of a natural language search query to which a negation portion applies, in accordance with some embodiments of the disclosure. Process 800 may be implemented on control circuitry 406. In addition, one or more actions of process 800 may be incorporated into or combined with one or more actions of any other process or embodiment described herein.

At 802, control circuitry 406, using, e.g., natural language processing circuitry 408, determines a language in which the natural language search query was entered. For example, control circuitry 406 may compare one or more words of the natural language search query with dictionaries for a number of different languages to identify a language that contains the one or more words of the natural language search query. Alternatively, control circuitry 406 may determine a geographic location of a device from which the natural language search query was entered using, for example, an IP address, a time signature indicating a particular time zone, or other metadata associated with the natural language search query. If the natural language search query was received as a voice query, control circuitry 406 may compare audio characteristics of the voice query with an accent database to determine the language being spoken in the voice query.

At 804, control circuitry 406, using, e.g., natural language processing circuitry 408, identifies, based on the language, a set of grammatical structures in the natural language search query. For example, control circuitry 406 may retrieve a set of grammatical rules for the language. Control circuitry 406 then uses the grammatical rules, such as word order, punctuation, etc., to determine a set of grammatical structures (e.g., noun-adjective pairs, noun-verb pairs, etc.) in the natural language search query. At 806, control circuitry 406, using, e.g., natural language processing circuitry 408, identifies, based on the grammatical structures, a dialect of the language. For example, certain dialects of a particular language may employ grammatical structures that are unique to that dialect. Control circuitry 406 may compare the grammatical structures with known grammatical structures of each dialect to determine a specific dialect of the language in which the natural language search query was entered.

At 808, control circuitry 406 retrieves a set of linguistic rules pertaining to the dialect. At 810, control circuitry 406 determines, based on the linguistic rules, whether the negation portion precedes or follows the portion to which it applies. For example, in some dialects of a language, a word may be negated only by a negation word placed immediately before the word to be negated, while in other dialects of the same language, the negation term must be placed immediately after the word to be negated in order to effectively negate that word. Using the linguistic rules, control circuitry 406 can determine whether the dialect in question requires placement of negation words in certain positions relative to the term to be negated and can thus infer the correct term to which the negation portion applies. If the negation portion precedes the portion to which it applies ("Precede" at 810), then, at 812, control circuitry 406 identifies the portion immediately following the negation portion as the portion to which the negation portion applies. If the negation portion follows the portion to which it applies ("Follow" at 810), then at 814, control circuitry 406 identifies the portion immediately preceding the negation portion as the portion to which the negation portion applies.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
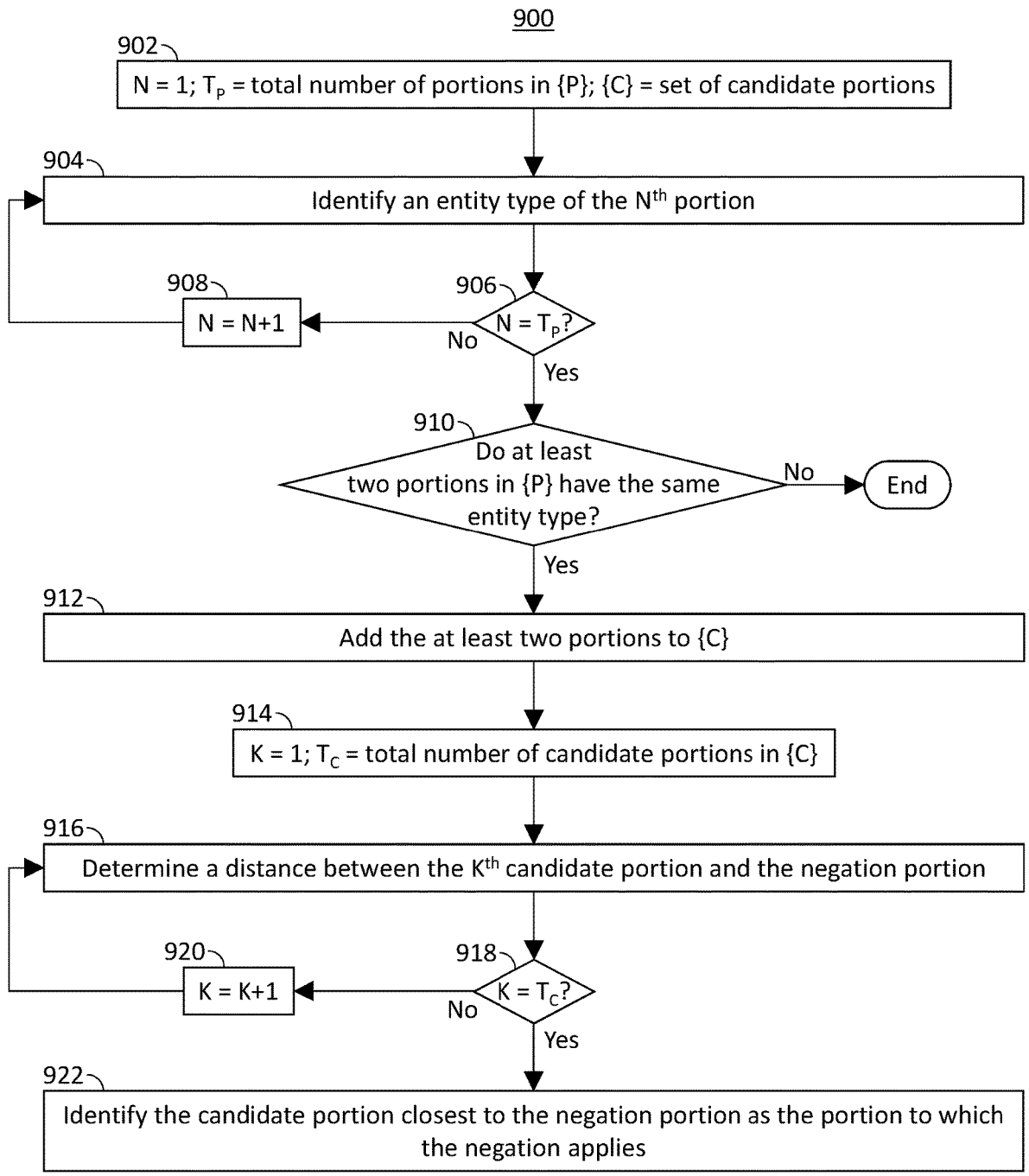
FIG. 9 is a flowchart representing a second process for identifying a portion of a natural language search query to which a negation portion applies, in accordance with some embodiments of the disclosure.

FIG. 9 is a flowchart representing a second illustrative process 900 for identifying a portion of a natural language search query to which a negation portion applies, in accordance with some embodiments of the disclosure. Process 900 may be implemented on control circuitry 406. In addition, one or more actions of process 900 may be incorporated into or combined with one or more actions of any other process or embodiment described herein.

At 902, control circuitry 406 initializes a counter variable N, setting its value to one, a variable $T_P$ representing the total number of portions in data set {P}, and a data set {C} for storing a set of candidate portions. At 904, control circuitry 406, using, e.g., natural language processing circuitry 408, identifies an entity type of the $N^{th}$ portion in {P}. For example, control circuitry 406 may determine a part of speech of the $N^{th}$ portion. If the $N^{th}$ portion is a proper noun, control circuitry 406 may identify the type of proper noun, e.g., a title, a name, or a place. At 906, control circuitry 406 determines whether N is equal to $T_P$, meaning that an entity type has been determined for all portions in {P}. If N is not equal to $T_P$ ("No" at 906), then, at 908, control circuitry 460 increments the value of N by one and processing returns to step 904.

If N is equal to $T_P$ ("Yes" at 906), then, at 910, control circuitry 406 determines whether at least two portions in {P} have the same entity type. For example, control circuitry 406 may compare the entity type for a first portion with the entity type of each other portion in {P}. Alternatively, while identifying entity types for each portion in {P}, control circuitry 406 may use counter variables to track the number of each entity type identified from among all the portions in {P}. Control circuitry 406 may then determine if the value of a counter corresponding to a particular entity type is more than one. If no two portions in {P} have the same entity type, then the process is completed.

If at least two portions in {P} have the same entity type ("Yes" at 910), then, at 912, control circuitry 406 adds the at least two portions to {C}. At 914, control circuitry 406 initializes another counter variable K, setting its value to 1, and a variable $T_C$ representing the total number of candidate portions in {C}. At 916, control circuitry 406 determines a distance between the $K^{th}$ candidate portion and the negation portion. For example, control circuitry 406 may determine a number of words between the negation portion and the $K^{th}$ candidate portion. At 918, control circuitry 406 determines whether K is equal to $T_C$, meaning that the distance between the negation portion and each candidate portion has been determined. If K is not equal to $T_C$ ("No" at 918), then, at 920, control circuitry 406 increments that value of K by one, and processing returns to step 916. If K is equal to $T_C$ ("Yes" at 918), then, at 922, control circuitry 406 identifies the candidate portion closest to the negation portion as the portion to which the negation portion applies.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

This specification discloses embodiments including, but not limited to, the following items.

1. A method for processing negation in a natural language search query, the method comprising:
 parsing the natural language search query to identify a plurality of portions of the natural language search query;
 determining that a first portion of the plurality of portions of the natural language search query is a negation portion;
 identifying a second portion to which the negation portion applies;
 generating a content query including a negation parameter corresponding to the second portion, and at least one other parameter corresponding to at least one other portion of the plurality of portions of the natural language search query; and generating for output at least one search result retrieved in response to the content query.

2. The method of item 1, wherein parsing the natural language search query to identify the plurality of portions of the natural language search query further comprises:
 identifying a plurality of words of the natural language search query;
 tagging each word of the plurality of words with a corresponding part of speech;
 determining whether a first word and a second word immediately following the first word form a portion;
 in response to determining that the first word and the second word form a portion, identifying the first word and the second word as a portion of the plurality of portions; and
 in response to determining that the first word and the second word do not form a portion, identifying the first word as a portion of the plurality of portions.

3. The method of item 1, wherein determining that a first portion of the plurality of portions of the natural language search query is a negation portion further comprises:
 determining whether a word of the first portion includes a negation prefix;
 determining whether a word of the first portion includes a negation suffix; and
 determining whether a phrase formed from two or more words of the first portion matches a negation phrase list.

4. The method of item 1, wherein identifying a second portion to which the negation portion applies further comprises:
 determining, based on natural language processing, whether the negation portion precedes a portion to which it applies or whether the negation portion follows a portion to which it applies;
 in response to determining that the negation portion precedes the portion to which it applies, identifying the portion immediately following the negation portion as the portion to which the negation portion applies; and
 in response to determining that the negation portion follows the portion to which it applies, identifying the portion immediately preceding the negation portion as the portion to which the negation portion applies.

5. The method of item 4, wherein determining whether the negation portion precedes a portion to which it applies or whether the negation portion follows a portion to which it applies further comprises:
 determining a language in which the natural language search query was entered;
 identifying, based on grammatical structures of the natural language search query, a dialect of the language;
 retrieving a set of linguistic rules pertaining to the dialect; and
 determining, based on the set of linguistic rules, whether the negation portion precedes the portion to which it applies or whether the negation portion follows the portion to which it applies.

6. The method of item 1, wherein identifying a second portion to which the negation portion applies further comprises:
 identifying an entity type of each portion of the plurality of portions;
 identifying at least two candidate portions of the plurality of portions having the same entity type;
 determining a distance between each candidate portion and the negation portion; and
 identifying the candidate portion closest to the negation portion as the portion to which the negation portion applies.

7. The method of item 1, wherein the natural language search query is parsed using a machine learning algorithm.

8. The method of item 7, wherein the machine learning algorithm is one of a conditional random field algorithm and a Hidden Markov Model.

9. The method of item 1, wherein the natural language search query is parsed using a neural network.

10. The method of item 9, wherein the neural network uses a long short-term memory architecture.

11. A system for processing negation in a natural language search query, the system comprising:
 input circuitry configured to receive a natural language search query; and
 control circuitry configured to:
 parse the natural language search query to identify a plurality of portions of the natural language search query;
 determine that a first portion of the plurality of portions of the natural language search query is a negation portion;
 identify a second portion to which the negation portion applies;

generate a content query including a negation parameter corresponding to the second portion, and at least one other parameter corresponding to at least one other portion of the plurality of portions of the natural language search query; and generate for output at least one search result retrieved in response to the content query.

12. The system of item 11, wherein the control circuitry configured to parse the natural language search query to identify the plurality of portions of the natural language search query is further configured to:

identify a plurality of words of the natural language search query;

tag each word of the plurality of words with a corresponding part of speech;

determine whether a first word and a second word immediately following the first word form a portion;

in response to determining that the first word and the second word form a portion, identify the first word and the second word as a portion of the plurality of portions; and in response to determining that the first word and the second word do not form a portion, identify the first word as a portion of the plurality of portions.

13. The system of item 11, wherein the control circuitry configured to determine that a first portion of the plurality of portions of the natural language search query is a negation portion is further configured to:

determine whether a word of the first portion includes a negation prefix;

determine whether a word of the first portion includes a negation suffix; and determine whether a phrase formed from two or more words of the first portion matches a negation phrase list.

14. The system of item 11, wherein the control circuitry configured to identify a second portion to which the negation portion applies is further configured to:

determine, based on natural language processing, whether the negation portion precedes a portion to which it applies or whether the negation portion follows a portion to which it applies;

in response to determining that the negation portion precedes the portion to which it applies, identify the portion immediately following the negation portion as the portion to which the negation portion applies; and in response to determining that the negation portion follows the portion to which it applies, identify the portion immediately preceding the negation portion as the portion to which the negation portion applies.

15. The system of item 14, wherein the control circuitry configured to determine whether the negation portion precedes a portion to which it applies or whether the negation portion follows a portion to which it applies is further configured to:

determine a language in which the natural language search query was entered;

identify, based on grammatical structures of the natural language search query, a dialect of the language;

retrieve a set of linguistic rules pertaining to the dialect; and determine, based on the set of linguistic rules, whether the negation portion precedes the portion to which it applies or whether the negation portion follows the portion to which it applies.

16. The system of item 11, wherein the control circuitry configured to identify a second portion to which the negation portion applies is further configured to:

identify an entity type of each portion of the plurality of portions;

identify at least two candidate portions of the plurality of portions having the same entity type;

determine a distance between each candidate portion and the negation portion; and identify the candidate portion closest to the negation portion as the portion to which the negation portion applies.

17. The system of item 11, wherein the natural language search query is parsed using a machine learning algorithm.

18. The system of item 17, wherein the machine learning algorithm is one of a conditional random field algorithm and a Hidden Markov Model.

19. The system of item 11, wherein the natural language search query is parsed using a neural network.

20. The system of item 19, wherein the neural network uses a long short-term memory architecture.

21. A system for processing negation in a natural language search query, the system comprising:

means for parsing the natural language search query to identify a plurality of portions of the natural language search query;

means for determining that a first portion of the plurality of portions of the natural language search query is a negation portion;

means for identifying a second portion to which the negation portion applies;

means for generating a content query including a negation parameter corresponding to the second portion, and at least one other parameter corresponding to at least one other portion of the plurality of portions of the natural language search query; and means for generating for output at least one search result retrieved in response to the content query.

22. The system of item 21, wherein the means for parsing the natural language search query to identify the plurality of portions of the natural language search query further comprises:

means for identifying a plurality of words of the natural language search query;

means for tagging each word of the plurality of words with a corresponding part of speech;

means for determining whether a first word and a second word immediately following the first word form a portion;

means for, in response to determining that the first word and the second word form a portion, identifying the first word and the second word as a portion of the plurality of portions; and means for, in response to determining that the first word and the second word do not form a portion, identifying the first word as a portion of the plurality of portions.

23. The system of item 21, wherein the means for determining that a first portion of the plurality of portions of the natural language search query is a negation portion further comprises:

determining whether a word of the first portion includes a negation prefix;

determining whether a word of the first portion includes a negation suffix; and determining whether a phrase formed from two or more words of the first portion matches a negation phrase list.

24. The system of item 21, wherein the means for identifying a second portion to which the negation portion applies further comprises:

means for determining, based on natural language processing, whether the negation portion precedes a portion to which it applies or whether the negation portion follows a portion to which it applies;

means for, in response to determining that the negation portion precedes the portion to which it applies, identifying the portion immediately following the negation portion as the portion to which the negation portion applies; and means for, in response to determining that the negation portion follows the portion to which it applies, identifying the portion immediately preceding the negation portion as the portion to which the negation portion applies.

25. The system of item 24, wherein the means for determining whether the negation portion precedes a portion to which it applies or whether the negation portion follows a portion to which it applies further comprises:

means for determining a language in which the natural language search query was entered;

means for identifying, based on grammatical structures of the natural language search query, a dialect of the language;

means for retrieving a set of linguistic rules pertaining to the dialect; and means for determining, based on the set of linguistic rules, whether the negation portion precedes the portion to which it applies or whether the negation portion follows the portion to which it applies.

26. The system of item 21, wherein the means for identifying a second portion to which the negation portion applies further comprises:

means for identifying an entity type of each portion of the plurality of portions;

means for identifying at least two candidate portions of the plurality of portions having the same entity type;

means for determining a distance between each candidate portion and the negation portion; and means for identifying the candidate portion closest to the negation portion as the portion to which the negation portion applies.

27. The system of item 21, wherein the natural language search query is parsed using a machine learning algorithm.

28. The system of item 27, wherein the machine learning algorithm is one of a conditional random field algorithm and a Hidden Markov Model.

29. The system of item 21, wherein the natural language search query is parsed using a neural network.

30. The system of item 29, wherein the neural network uses a long short-term memory architecture.

31. A non-transitory computer-readable medium having non-transitory computer-readable instructions encoded thereon for processing negation in a natural language search query that, when executed by control circuitry, cause the control circuitry to:

parse the natural language search query to identify a plurality of portions of the natural language search query;

determine that a first portion of the plurality of portions of the natural language search query is a negation portion;

identify a second portion to which the negation portion applies;

generate a content query including a negation parameter corresponding to the second portion, and at least one other parameter corresponding to at least one other portion of the plurality of portions of the natural language search query; and generate for output at least one search result retrieved in response to the content query.

32. The non-transitory computer-readable medium of item 31, wherein execution of the instruction to parse the natural language search query to identify the plurality of portions of the natural language search query further causes the control circuitry to:

identify a plurality of words of the natural language search query;

tag each word of the plurality of words with a corresponding part of speech;

determine whether a first word and a second word immediately following the first word form a portion;

in response to determining that the first word and the second word form a portion, identify the first word and the second word as a portion of the plurality of portions; and in response to determining that the first word and the second word do not form a portion, identify the first word as a portion of the plurality of portions.

33. The non-transitory computer-readable medium of item 31, wherein execution of the instruction to determine that a first portion of the plurality of portions of the natural language search query is a negation portion further causes the control circuitry to:

determine whether a word of the first portion includes a negation prefix;

determine whether a word of the first portion includes a negation suffix; and determine whether a phrase formed from two or more words of the first portion matches a negation phrase list.

34. The non-transitory computer-readable medium of item 31, wherein execution of the instruction to identify a second portion to which the negation portion applies further causes the control circuitry to:

determine, based on natural language processing, whether the negation portion precedes a portion to which it applies or whether the negation portion follows a portion to which it applies;

in response to determining that the negation portion precedes the portion to which it applies, identify the portion immediately following the negation portion as the portion to which the negation portion applies; and in response to determining that the negation portion follows the portion to which it applies, identify the portion immediately preceding the negation portion as the portion to which the negation portion applies.

35. The non-transitory computer-readable medium of item 34, wherein execution of the instruction to determine whether the negation portion precedes a portion to which it applies or whether the negation portion follows a portion to which it applies further causes the control circuitry to:

determine a language in which the natural language search query was entered;

identify, based on grammatical structures of the natural language search query, a dialect of the language;

retrieve a set of linguistic rules pertaining to the dialect; and determine, based on the set of linguistic rules, whether the negation portion precedes the portion to which it applies or whether the negation portion follows the portion to which it applies.

36. The non-transitory computer-readable medium of item 31, wherein execution of the instruction to identify a second portion to which the negation portion applies further causes the control circuitry to:

identify an entity type of each portion of the plurality of portions;

identify at least two candidate portions of the plurality of portions having the same entity type;

determine a distance between each candidate portion and the negation portion; and identify the candidate portion closest to the negation portion as the portion to which the negation portion applies.

37. The non-transitory computer-readable medium of item 31, wherein the natural language search query is parsed using a machine learning algorithm.

38. The non-transitory computer-readable medium of item 37, wherein the machine learning algorithm is one of a conditional random field algorithm and a Hidden Markov Model.

39. The non-transitory computer-readable medium of item 31, wherein the natural language search query is parsed using a neural network.

40. The non-transitory computer-readable medium of item 39, wherein the neural network uses a long short-term memory architecture.

41. A method for processing negation in a natural language search query, the method comprising:
   receiving a natural language search query;
   parsing the natural language search query to identify a plurality of portions of the natural language search query;
   determining that a first portion of the plurality of portions of the natural language search query is a negation portion;
   identifying a second portion to which the negation portion applies;
   generating a content query including a negation parameter corresponding to the second portion, and at least one other parameter corresponding to at least one other portion of the plurality of portions of the natural language search query; and
   generating for output at least one search result retrieved in response to the content query.

42. The method of item 41, wherein parsing the natural language search query to identify the plurality of portions of the natural language search query further comprises:
   identifying a plurality of words of the natural language search query;
   tagging each word of the plurality of words with a corresponding part of speech;
   determining whether a first word and a second word immediately following the first word form a portion;
   in response to determining that the first word and the second word form a portion, identifying the first word and the second word as a portion of the plurality of portions; and
   in response to determining that the first word and the second word do not form a portion, identifying the first word as a portion of the plurality of portions.

43. The method of any of items 41-42, wherein determining that a first portion of the plurality of portions of the natural language search query is a negation portion further comprises:
   determining whether a word of the first portion includes a negation prefix;
   determining whether a word of the first portion includes a negation suffix; and
   determining whether a phrase formed from two or more words of the first portion matches a negation phrase list.

44. The method of any of items 41-43, wherein identifying a second portion to which the negation portion applies further comprises:
   determining, based on natural language processing, whether the negation portion precedes a portion to which it applies or whether the negation portion follows a portion to which it applies;
   in response to determining that the negation portion precedes the portion to which it applies, identifying the portion immediately following the negation portion as the portion to which the negation portion applies; and
   in response to determining that the negation portion follows the portion to which it applies, identifying the portion immediately preceding the negation portion as the portion to which the negation portion applies.

45. The method of item 44, wherein determining whether the negation portion precedes a portion to which it applies or whether the negation portion follows a portion to which it applies further comprises:
   determining a language in which the natural language search query was entered;
   identifying, based on grammatical structures of the natural language search query, a dialect of the language;
   retrieving a set of linguistic rules pertaining to the dialect; and
   determining, based on the set of linguistic rules, whether the negation portion precedes the portion to which it applies or whether the negation portion follows the portion to which it applies.

46. The method of any of items 41-45, wherein identifying a second portion to which the negation portion applies further comprises:
   identifying an entity type of each portion of the plurality of portions;
   identifying at least two candidate portions of the plurality of portions having the same entity type;
   determining a distance between each candidate portion and the negation portion; and
   identifying the candidate portion closest to the negation portion as the portion to which the negation portion applies.

47. The method of any of items 41-46, wherein the natural language search query is parsed using a machine learning algorithm.

48. The method of item 47, wherein the machine learning algorithm is one of a conditional random field algorithm and a Hidden Markov Model.

49. The method of any of items 41-46, wherein the natural language search query is parsed using a neural network.

50. The method of item 49, wherein the neural network uses a long short-term memory architecture.

What is claimed is:
1. A method for processing negation in a natural language search query, the method comprising:
   receiving the natural language search query;
   parsing the natural language search query to identify a plurality of portions of the natural language search query;
   determining that a first portion of the plurality of portions of the natural language search query is a negation portion;
   identifying a second portion to which the negation portion applies by:
      identifying an entity type of each portion of the plurality of portions;
      identifying at least two candidate portions of the plurality of portions having the same entity type;
      determining a distance between each candidate portion and the negation portion; and
      identifying a candidate portion of the at least two candidate portions closest to the negation portion as the portion to which the negation portion applies;
   identifying a third portion to which the negation portion does not apply;
   generating a content query including a negation parameter corresponding to the second portion, and at least one other parameter corresponding to at least the third portion; and generating for output at least one search result retrieved in response to the content query.

2. The method of claim 1,
wherein determining that the first portion of the plurality of portions of the natural language search query is the negation portion further comprises:
   determining whether a word of the first portion includes a negation prefix, wherein the negation prefix is present at a beginning of the word to adjust or qualify a meaning of the word;
   determining whether the word of the first portion includes a negation suffix, wherein the negation suffix is present at an end of the word to adjust or qualify the meaning of the word; and
   determining whether a phrase formed from two or more words of the first portion matches a negation phrase list.

3. The method of claim 1, wherein parsing the natural language search query to identify the plurality of portions of the natural language search query further comprises:
   identifying a plurality of words of the natural language search query;
   tagging each word of the plurality of words with a corresponding part of speech;
   determining whether a first word and a second word immediately following the first word form a portion;
   in response to determining that the first word and the second word form a portion, identifying the first word and the second word as a portion of the plurality of portions; and
   in response to determining that the first word and the second word do not form a portion, identifying the first word as a portion of the plurality of portions.

4. The method of claim 1, wherein identifying the second portion to which the negation portion applies further comprises:
   determining, based on natural language processing, whether the negation portion precedes a portion to which it applies or whether the negation portion follows a portion to which it applies;
   in response to determining that the negation portion precedes the portion to which it applies, identifying the portion immediately following the negation portion as the portion to which the negation portion applies; and
   in response to determining that the negation portion follows the portion to which it applies, identifying the portion immediately preceding the negation portion as the portion to which the negation portion applies.

5. The method of claim 4, wherein determining whether the negation portion precedes the portion to which it applies or whether the negation portion follows the portion to which it applies further comprises:
   determining a language in which the natural language search query was entered;
   identifying, based on grammatical structures of the natural language search query, a dialect of the language;
   retrieving a set of linguistic rules pertaining to the dialect; and
   determining, based on the set of linguistic rules, whether the negation portion precedes the portion to which it applies or whether the negation portion follows the portion to which it applies.

6. The method of claim 1, wherein the natural language search query is parsed using a machine learning algorithm.

7. The method of claim 6, wherein the machine learning algorithm is one of a conditional random field algorithm and a Hidden Markov Model.

8. The method of claim 1, wherein the natural language search query is parsed using a neural network.

9. The method of claim 8, wherein the neural network uses a long short-term memory architecture.

10. A system for processing negation in a natural language search query, the system comprising:
   input/output circuitry configured to receive the natural language search query; and
   control circuitry configured to:
      parse the natural language search query to identify a plurality of portions of the natural language search query;
      determine that a first portion of the plurality of portions of the natural language search query is a negation portion;
      identify a second portion to which the negation portion applies;
      identify a third portion to which the negation portion does not apply by:
         identifying an entity type of each portion of the plurality of portions;
         identifying at least two candidate portions of the plurality of portions having the same entity type;
         determining a distance between each candidate portion and the negation portion; and
         identifying a candidate portion of the at least two candidate portions closest to the negation portion as the portion to which the negation portion applies;
      identify a third portion to which the negation portion does not apply;
      generate a content query including a negation parameter corresponding to the second portion, and at least one other parameter corresponding to at least the third portion; and
      generate for output at least one search result retrieved in response to the content query.

11. The system of claim 10,
wherein the input/output circuitry configured to determine that the first portion of the plurality of portions of the natural language search query is the negation portion is further configured to:
   determine whether a word of the first portion includes a negation prefix, wherein the negation prefix is present at a beginning of a word to adjust or qualify a meaning of the word;
   determine whether the word of the first portion includes a negation suffix, wherein the negation suffix is present at the end of the word to adjust or qualify the meaning of the word; and
   determine whether a phrase formed from two or more words of the first portion matches a negation phrase list.

12. The system of claim 10, wherein the control circuitry configured to parse the natural language search query to identify the plurality of portions of the natural language search query is further configured to:
   identify a plurality of words of the natural language search query;
   tag each word of the plurality of words with a corresponding part of speech;
   determine whether a first word and a second word immediately following the first word form a portion;
   in response to determining that the first word and the second word form a portion, identify the first word and the second word as a portion of the plurality of portions; and in response to determining that the first word and the second word do not form a portion, identify the first word as a portion of the plurality of portions.

13. The system of claim 10, wherein the control circuitry configured to identify the second portion to which the negation portion applies is further configured to:
   determine, based on natural language processing, whether the negation portion precedes a portion to which it applies or whether the negation portion follows a portion to which it applies;
   in response to determining that the negation portion precedes the portion to which it applies, identify the portion immediately following the negation portion as the portion to which the negation portion applies; and
   in response to determining that the negation portion follows the portion to which it applies, identify the portion immediately preceding the negation portion as the portion to which the negation portion applies.

14. The system of claim 13, wherein the control circuitry configured to determine whether the negation portion precedes the portion to which it applies or whether the negation portion follows the portion to which it applies is further configured to:
   determine a language in which the natural language search query was entered;
   identify, based on grammatical structures of the natural language search query, a dialect of the language;
   retrieve a set of linguistic rules pertaining to the dialect; and
   determine, based on the set of linguistic rules, whether the negation portion precedes the portion to which it applies or whether the negation portion follows the portion to which it applies.

15. The system of claim 10, wherein the natural language search query is parsed using a machine learning algorithm.

16. The system of claim 15, wherein the machine learning algorithm is one of a conditional random field algorithm and a Hidden Markov Model.

17. The system of claim 10, wherein the natural language search query is parsed using a neural network.

18. The system of claim 17, wherein the neural network uses a long short-term memory architecture.

* * * * *